(12) United States Patent
Wolrich et al.

(10) Patent No.: US 7,158,964 B2
(45) Date of Patent: Jan. 2, 2007

(54) QUEUE MANAGEMENT

(75) Inventors: Gilbert Wolrich, Framingham, MA (US); Mark B. Rosenbluth, Uxbridge, MA (US); Debra Bernstein, Sudbury, MA (US); Donald F. Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 576 days.

(21) Appl. No.: 10/020,815

(22) Filed: Dec. 12, 2001

(65) Prior Publication Data

US 2003/0110166 A1  Jun. 12, 2003

(51) Int. Cl.
*G06F 17/30* (2006.01)
(52) U.S. Cl. ......................................................... 707/3
(58) Field of Classification Search .................... 707/1, 707/2, 6, 8, 10, 3, 200; 370/412, 390, 395.7, 370/398; 709/226, 224
See application file for complete search history.

(56) References Cited

U.S. PATENT DOCUMENTS

| | | |
|---|---|---|
| 3,373,408 A | 3/1968 | Ling |
| 3,478,322 A | 11/1969 | Evans |
| 3,792,441 A | 2/1974 | Wymore et al. |
| 3,940,745 A | 2/1976 | Sajeva |
| 4,130,890 A | 12/1978 | Adam |
| 4,400,770 A | 8/1983 | Chan et al. |
| 4,514,807 A | 4/1985 | Nogi |
| 4,523,272 A | 6/1985 | Fukunaga et al. |
| 4,745,544 A | 5/1988 | Renner et al. |
| 4,866,664 A | 9/1989 | Burkhardt, Jr. et al. |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,185,861 A | 2/1993 | Valencia |
| 5,255,239 A | 10/1993 | Taborn et al. |
| 5,263,169 A | 11/1993 | Genusov et al. |
| 5,268,900 A | 12/1993 | Hluchyj et al. |
| 5,347,648 A | 9/1994 | Stamm et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,482 A | 4/1995 | Stamm et al. |

(Continued)

FOREIGN PATENT DOCUMENTS

EP  0 379 709  8/1990

(Continued)

OTHER PUBLICATIONS

Byrd et al., "Multithread Processor Architectures," *IEEE Spectrum*, vol. 32, No. 8, New York, Aug. 1, 1995, pp. 38-46.

(Continued)

*Primary Examiner*—E P LeRoux
(74) *Attorney, Agent, or Firm*—Fish & Richardson P.C.

(57) ABSTRACT

A method of managing queue entries includes storing addresses in a first queue entry as a linked list, each of the stored addresses including a cell count, retrieving a first address from the first queue entry, and modifying the linked list of addresses of the first queue entry based on the cell count of the first address retrieved.

31 Claims, 4 Drawing Sheets

U.S. PATENT DOCUMENTS

| | | |
|---|---|---|
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,517,648 A | 5/1996 | Bertone et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,592,622 A | 1/1997 | Isfeld et al. |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,634,015 A | 5/1997 | Chang et al. |
| 5,644,623 A | 7/1997 | Gulledge |
| 5,649,092 A | 7/1997 | Price et al. |
| 5,649,157 A | 7/1997 | Williams |
| 5,659,687 A | 8/1997 | Kim et al. |
| 5,671,446 A | 9/1997 | Rakity et al. |
| 5,680,641 A | 10/1997 | Sidman |
| 5,684,962 A | 11/1997 | Black et al. |
| 5,689,566 A | 11/1997 | Nguyen |
| 5,699,537 A | 12/1997 | Sharangpani et al. |
| 5,717,898 A | 2/1998 | Kagan et al. |
| 5,721,870 A | 2/1998 | Matsumoto |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahanti-Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. |
| 5,832,215 A | 11/1998 | Kato et al. |
| 5,835,755 A | 11/1998 | Stellwagen, Jr. |
| 5,850,395 A * | 12/1998 | Hauser et al. .............. 370/398 |
| 5,854,922 A | 12/1998 | Gravenstein et al. |
| 5,860,158 A | 1/1999 | Pai et al. |
| 5,872,769 A * | 2/1999 | Caldara et al. ............. 370/230 |
| 5,873,089 A | 2/1999 | Regache |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,893,162 A | 4/1999 | Lau et al. |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,958,031 A | 9/1999 | Kim |
| 5,961,628 A | 10/1999 | Nguyen et al. |
| 5,970,013 A | 10/1999 | Fischer et al. |
| 5,974,518 A | 10/1999 | Nogradi |
| 5,978,838 A | 11/1999 | Mohamed et al. |
| 5,983,274 A | 11/1999 | Hyder et al. |
| 6,012,151 A | 1/2000 | Mano |
| 6,014,729 A | 1/2000 | Lannan et al. |
| 6,023,742 A | 2/2000 | Ebeling et al. |
| 6,058,168 A | 5/2000 | Braband |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,079,008 A | 6/2000 | Clery, III |
| 6,085,215 A | 7/2000 | Ramakrishnan et al. |
| 6,085,294 A | 7/2000 | Van Doren et al. |
| 6,092,127 A | 7/2000 | Tausheck |
| 6,092,158 A | 7/2000 | Harriman et al. |
| 6,112,016 A | 8/2000 | MacWilliams et al. |
| 6,134,665 A | 10/2000 | Klein et al. |
| 6,141,689 A | 10/2000 | Yasrebi |
| 6,141,765 A | 10/2000 | Sherman |
| 6,144,669 A | 11/2000 | Williams et al. |
| 6,145,054 A | 11/2000 | Mehrotra et al. |
| 6,157,955 A | 12/2000 | Narad et al. |
| 6,160,562 A | 12/2000 | Chin et al. |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,279 B1 | 4/2001 | Nishimura et al. |
| 6,247,025 B1 | 6/2001 | Bacon |
| 6,256,713 B1 | 7/2001 | Audityan et al. |
| 6,272,616 B1 | 8/2001 | Fernando et al. |
| 6,275,505 B1 | 8/2001 | O Loughlin et al. |
| 6,279,113 B1 | 8/2001 | Vaidya |
| 6,289,011 B1 | 9/2001 | Seo et al. |
| 6,298,370 B1 | 10/2001 | Tang et al. |
| 6,307,789 B1 | 10/2001 | Wolrich et al. |
| 6,320,861 B1 * | 11/2001 | Adam et al. ............. 370/395.7 |
| 6,324,624 B1 | 11/2001 | Wolrich et al. |
| 6,345,334 B1 | 2/2002 | Nakagawa et al. |
| 6,347,341 B1 | 2/2002 | Glassen et al. |
| 6,347,344 B1 | 2/2002 | Baker et al. |
| 6,351,474 B1 | 2/2002 | Robinett et al. |
| 6,356,962 B1 | 3/2002 | Kasper et al. |
| 6,359,911 B1 | 3/2002 | Movshovich et al. |
| 6,360,262 B1 | 3/2002 | Guenthner et al. |
| 6,373,848 B1 | 4/2002 | Allison et al. |
| 6,385,658 B1 | 5/2002 | Harter et al. |
| 6,389,449 B1 | 5/2002 | Nemirovsky et al. |
| 6,393,483 B1 | 5/2002 | Latif et al. |
| 6,393,531 B1 | 5/2002 | Novak et al. |
| 6,415,338 B1 | 7/2002 | Habot |
| 6,426,940 B1 | 7/2002 | Seo et al. |
| 6,426,957 B1 | 7/2002 | Hauser et al. |
| 6,427,196 B1 | 7/2002 | Adiletta et al. |
| 6,430,626 B1 | 8/2002 | Witkowski et al. |
| 6,434,145 B1 | 8/2002 | Opsasnick et al. |
| 6,438,651 B1 | 8/2002 | Slane |
| 6,463,072 B1 | 10/2002 | Wolrich et al. |
| 6,522,188 B1 | 2/2003 | Poole |
| 6,523,060 B1 | 2/2003 | Kao |
| 6,532,509 B1 | 3/2003 | Wolrich et al. |
| 6,539,024 B1 | 3/2003 | Janoska et al. |
| 6,552,826 B1 | 4/2003 | Adler et al. |
| 6,560,667 B1 | 5/2003 | Wolrich et al. |

| | | | |
|---|---|---|---|
| 6,577,542 B1 | 6/2003 | Wolrich et al. | |
| 6,584,522 B1 | 6/2003 | Wolrich et al. | |
| 6,587,906 B1 | 7/2003 | Wolrich et al. | |
| 6,606,704 B1 | 8/2003 | Adiletta et al. | |
| 6,625,654 B1 | 9/2003 | Wolrich et al. | |
| 6,631,430 B1 | 10/2003 | Wolrich et al. | |
| 6,631,462 B1 | 10/2003 | Wolrich et al. | |
| 6,658,546 B1 | 12/2003 | Calvignac et al. | |
| 6,661,794 B1 | 12/2003 | Wolrich et al. | |
| 6,667,920 B1 | 12/2003 | Wolrich et al. | |
| 6,668,317 B1 | 12/2003 | Bernstein et al. | |
| 6,681,300 B1 | 1/2004 | Wolrich et al. | |
| 6,684,303 B1 | 1/2004 | LaBerge | |
| 6,687,247 B1 | 2/2004 | Wilford et al. | |
| 6,694,380 B1 | 2/2004 | Wolrich et al. | |
| 6,724,721 B1 * | 4/2004 | Cheriton | 370/229 |
| 6,728,845 B1 | 4/2004 | Adiletta et al. | |
| 6,731,596 B1 | 5/2004 | Chiang et al. | |
| 6,754,223 B1 | 6/2004 | Lussier et al. | |
| 6,757,791 B1 | 6/2004 | O'Grady et al. | |
| 6,768,717 B1 | 7/2004 | Reynolds et al. | |
| 6,779,084 B1 | 8/2004 | Wolrich et al. | |
| 6,791,989 B1 | 9/2004 | Steinmetz et al. | |
| 6,795,447 B1 | 9/2004 | Kadambi et al. | |
| 6,804,239 B1 | 10/2004 | Lussier et al. | |
| 6,810,426 B1 | 10/2004 | Mysore et al. | |
| 6,813,249 B1 | 11/2004 | Lauffenburger et al. | |
| 6,816,498 B1 | 11/2004 | Viswanath | |
| 6,822,958 B1 * | 11/2004 | Branth et al. | 370/390 |
| 6,822,959 B1 | 11/2004 | Galbi et al. | |
| 6,842,457 B1 | 1/2005 | Malalur | |
| 6,850,999 B1 | 2/2005 | Mak et al. | |
| 6,868,087 B1 | 3/2005 | Agarwala et al. | |
| 6,876,561 B1 | 4/2005 | Adiletta et al. | |
| 6,888,830 B1 | 5/2005 | Snyder II et al. | |
| 6,895,457 B1 | 5/2005 | Wolrich et al. | |
| 6,975,637 B1 | 12/2005 | Lenell | |
| 2001/0014100 A1 * | 8/2001 | Abe et al. | 370/412 |
| 2002/0131443 A1 | 9/2002 | Robinett et al. | |
| 2002/0144006 A1 | 10/2002 | Cranston et al. | |
| 2002/0196778 A1 * | 12/2002 | Colmant et al. | 370/352 |
| 2003/0041216 A1 | 2/2003 | Rosenbluth et al. | |
| 2003/0046488 A1 | 3/2003 | Rosenbluth et al. | |
| 2003/0110166 A1 | 6/2003 | Wolrich et al. | |
| 2003/0115347 A1 | 6/2003 | Wolrich et al. | |
| 2003/0115426 A1 | 6/2003 | Rosenbluth et al. | |
| 2003/0131022 A1 | 7/2003 | Wolrich et al. | |
| 2003/0131198 A1 | 7/2003 | Wolrich et al. | |
| 2003/0140196 A1 | 7/2003 | Wolrich et al. | |
| 2003/0147409 A1 | 8/2003 | Wolrich et al. | |
| 2004/0039895 A1 | 2/2004 | Wolrich et al. | |
| 2004/0054880 A1 | 3/2004 | Bernstein et al. | |
| 2004/0071152 A1 | 4/2004 | Wolrich et al. | |
| 2004/0073778 A1 | 4/2004 | Adiletta et al. | |
| 2004/0098496 A1 | 5/2004 | Wolrich et al. | |
| 2004/0179533 A1 | 9/2004 | Donovan | |

FOREIGN PATENT DOCUMENTS

| | | |
|---|---|---|
| EP | 0 418 447 | 3/1991 |
| EP | 0 464 715 | 1/1992 |
| EP | 0 633 678 | 1/1995 |
| EP | 0 745 933 | 12/1996 |
| EP | 0 760 501 | 3/1997 |
| EP | 0 809 180 | 11/1997 |
| JP | 59111533 | 6/1984 |
| WO | WO 94/15287 | 7/1994 |
| WO | WO 97/38372 | 10/1997 |
| WO | WO 01/15718 | 3/2001 |
| WO | WO 01/16769 | 3/2001 |
| WO | WO 01/16770 | 3/2001 |
| WO | WO 01/16782 | 3/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |

OTHER PUBLICATIONS

Doyle et al., *Microsoft Press Computer Dictionary*, 2nd ed., Microsoft Press, Redmond, Washington, USA, 1994, p. 326.

U.S. Appl. No. 09/475,614, filed Dec. 30, 1999, Wolrich et al.

U.S. Appl. No. 09/473,571, filed Dec. 28, 1999, Wolrich et al.

Fillo et al., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the 5th Annual IEEE Symposium on Field-Programmable Custom Computing Machines, 1997.

Hyde, R., "Overview of Memory Management," *Byte*, vol. 13, No. 4, 1998, pp. 219-225.

Litch et al., "StrongARMing Portable Communications," IEEE Micro, 1998, pp. 48-55.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the 28th Annual Hawaii International Conference on System Sciences, 1995, pp. 191-201.

Trimberger et al, "A time-multiplexed FPGA," Proceedings of the 5th Annual IEEE Symposium on Field-Programmable Custom Computing Machines, 1998.

Turner et al., "Design of a High Performance Active Router," Internet Document, *Online*, Mar. 18, 1999.

Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.

Wazlowski et al., "PRSIM-II computer and architecture," IEEE Proceedings, Workshop on FPGAs for Custom Computing Machines, 1993.

Adiletta, et al., "The next generation of the Intel IXP Network Processors", Intel Technology Journal, Network Processors, vol. 6, issue 3, published Aug. 15, 2002, pp. 6-18.

Brewer, et al., "Remote Queues: Exposing Message Queues for Optimization and Atomicity", SPAA '95 Santa Barbara, CA, pp. 1-13.

Buyuktosunoglu, A., et al., "Tradeoffs in Power-Efficient Issue Queue Design", ISLPED '02, ACM, Aug. 2002, 6 pages.

Dandamudi, S., "Multiprocessors", IEEE Computer, Mar. 1997, pp. 82-89.

Hendler, D., et al., "Work Dealing", SPAA '02, ACM, Aug. 2002, pp. 164-172.

Jonkers, H., "Queueing Models of Shared-Memory Parallel Applications", Computer and Telecommunications Systems Performance Enginnering, Pentech Press, London, 1994, 13 pages.

Komaros, et al., "A Fully-Programmable Memory Management System Optimizing Queue Handling at Multi Gigabit Rates", ACM, Jun. 2-6, 2003, pp. 54-59.

Kumar, S., et al., "A Scalable, Cache-Based Queue Management Subsystem for Network Processors", no date, pp. 1-7.

Lymar, T., et al., "Data Streams Organization in Query Executor for Parallel DBMS", no date, 4 pages.

McLuckie, L., et al., "Using the RapidIO Messaging Unit on PowerQUICC [1]", Freescale Semiconductor, Inc., 2004 Rev. 1, pp. 1-19.

Michael, M., "Scalable Lock-Free Dynamic Memory Allocation", PLDI '04, ACM, Jun. 2004, pp. 1-12.

Pan, H., et al., "Heads and Tails: A Variable-Length Instruction Format Supporting Parallel Fetch and Decode", CASES 01, No. 16-17, 2001 8 pages.

Scott, M., "Non-Blocking Timeout in Scalable Queue-Based Spin Locks", PODC '02, ACM, Jul. 2002, pp. 31-40.

* cited by examiner

QUEUE MANAGEMENT

TECHNICAL FIELD

This invention relates to managing a queue structure and more specifically to scheduling the transmission of packets on an electronic network.

BACKGROUND

Electronic networks perform data transfers using a variety of data packet sizes. A packet size may be larger than the input or output capacity of a device connected to the network. Therefore a single packet may require multiple transfers of smaller "cells" to completely transfer the packet.

DESCRIPTION

Figure 1:
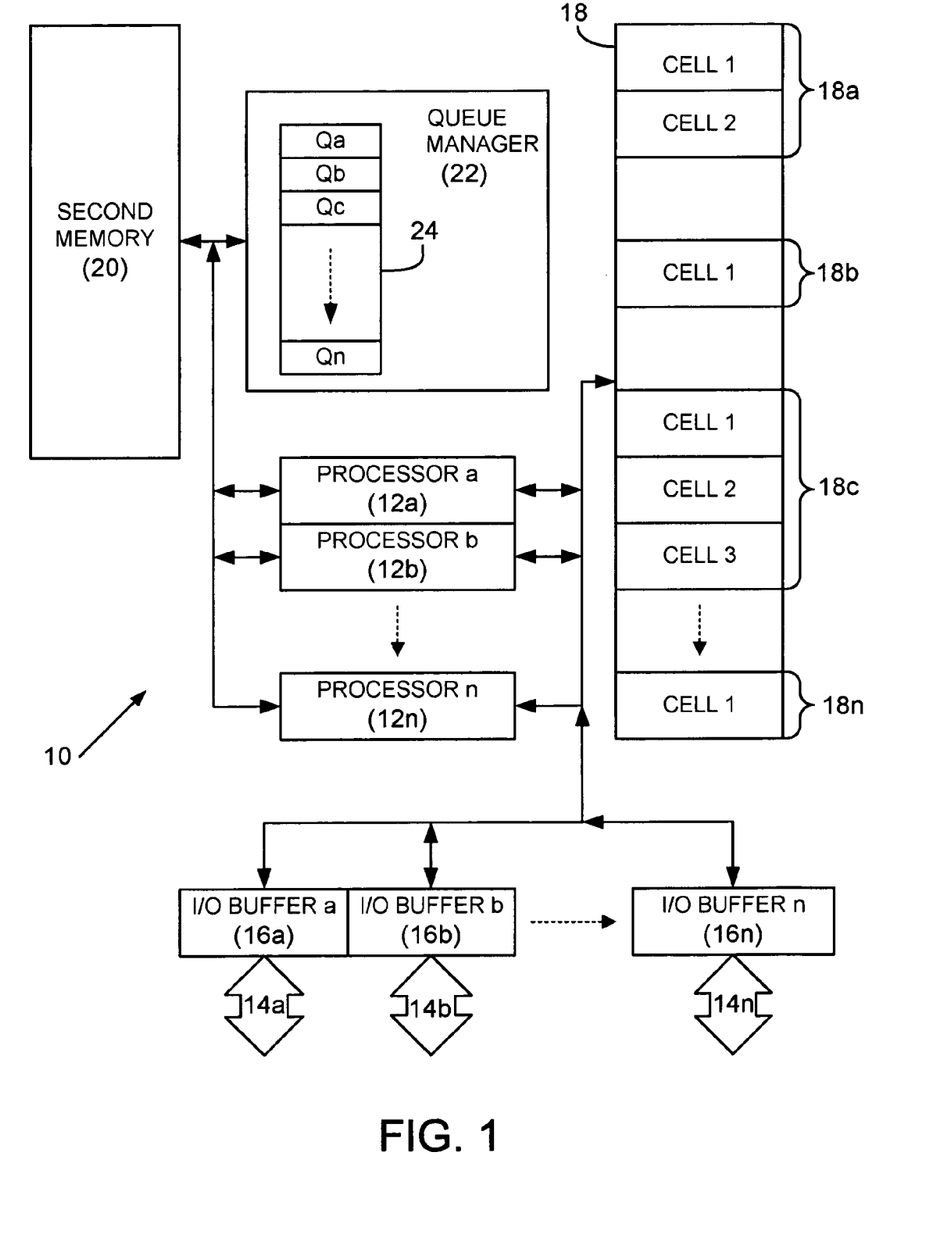
FIG. 1 is a block diagram of computer hardware on which a queue management process may be implemented.

Referring to FIG. 1, a network processing system 10 is shown operating as a data packet cross-bar device. The network processing system 10 receives packets (through I/O buses 14a–14n from external devices not shown), stores the packets temporarily, interprets header (address) information contained in each packet, and transmits each packet to a destination indicated by its header when an appropriate I/O bus 14a–14n is available. System 10 may include connections to thousands of I/O buses and may need to simultaneously store and track tens of thousands of data packets of various sizes before each packet is transmitted out of system 10. The storage and the input and output of data packets (packets) to and from I/O buses 14a–14n is controlled by several processors 12a–12n.

System 10 includes a first memory 18, to store the received data packets from a set of data buffers 18a–18n. The data buffers 18a–18n are not necessarily contiguously stored in the first memory 18. Each data buffer 18a–18n is indexed by a buffer descriptor address (BDA) that indicates the location and size of the buffer. As a packet is received from one of the I/O buses 14a–14n and stored by one of the processors 12a–12n in one of the buffers 18a–18n of the first memory 18, the processor, e.g., processor 12a identifies one of a set of I/O buffers 16a–16n for transmitting the packet from the data buffer 18a–18n out of system 10. Each of the I/O buffers 16a–16n is associated with one of the I/O buses 14a–14n.

Often, the I/O port chosen for transmitting a packet stored in an I/O buffer is busy receiving or sending packets for other I/O buffers. In this case, the system 10 includes a second memory 20 for storing the packet. The second memory 20 stores a queue array 24. The queue array 24 has buffer descriptor addresses (BDAs) for packets that are stored in data buffers 18a–18n of the first memory 18 and are waiting for an assigned I/O buffer 16a–16n to become available.

Each data packet received may vary in size. Therefore, the size of each data buffer 18a–18n may also vary in size. Furthermore, each data buffer 18a–18n may be logically partitioned by a processor 12a–12n into one or more "cells". Each cell partition represents a maximum size of a data packet that may be transmitted by an I/O buffer 16a–16n. For example, data buffer 18a is partitioned into two cells, data buffer 18b includes one cell, and data buffer 18c includes three cells.

System 10 also includes a queue manager 22 connected to processors 12a–12n and second memory 20. Queue manager 22 includes the queue array 24 that includes several queue entries, with each queue entry corresponding to an I/O buffer, 16a–16n. Each queue entry in queue array 24 stores multiple BDAs, where one BDA links to another BDA in the same queue. Queue array 24 is stored in second memory 20. Alternatively or in addition thereto the queue manager 22 may include a cache containing a sub-set of the contents of queue array 24.

Each BDA includes both an address of the stored data buffer in first memory 18, and a "cell count" that indicates the number of cells contained in data buffer 18a–18n. The BDA is, for example, 32 bits long, with the lower 24 bits being used for an address of the buffer descriptor and the upper 7 bits being used to indicate the cell count of the data buffer.

Processors 12a–12n store and retrieve data buffers from queue array 24 by sending "En-queue" and "De-queue" commands to queue manager 22. Each En-queue and De-queue command includes a queue entry number included in queue array 24. Queue manager 22 responds to a De-queue command by returning a BDA stored at a "head" of the queue 24, i.e., a top entry of the queue entry specified to the requesting processor. Queue manager 22 also uses the cell count included in the head BDA being returned to determine whether all of the cells included in the corresponding data packet have been sent. If the cell count is greater than zero, then the queue manager 22 leaves the head BDA in the head location of the queue 24. When the cell count for a De-queued BDA has reached zero another linked BDA is moved to the head of the queue 24, as will be explained.

Figure 2A:
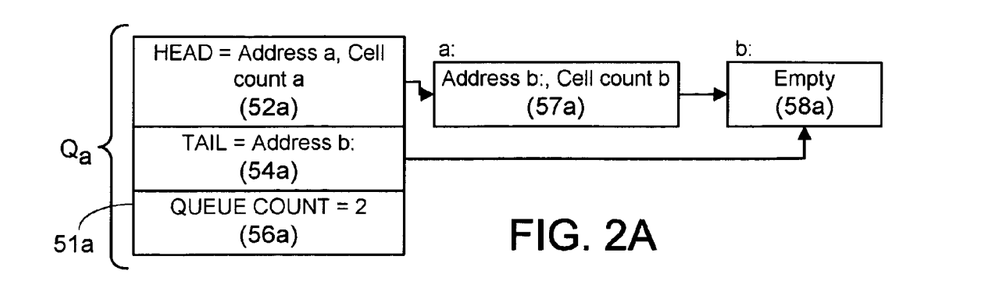
FIG. 2A is a block diagram representing an exemplary linked queue array.
Figure 2B:
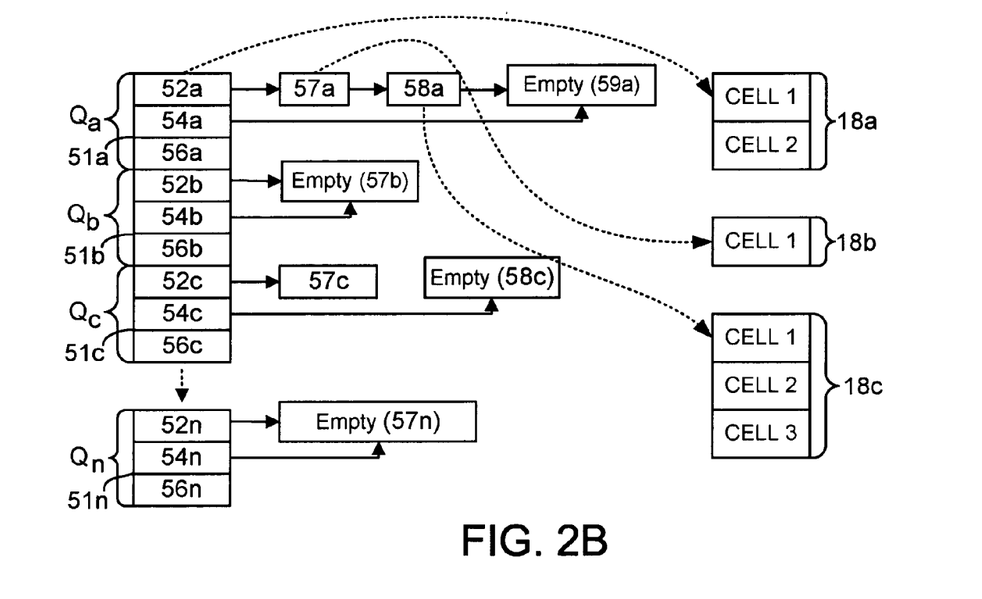
FIG. 2B is a block diagram representing addresses stored in a linked queue array being mapped to stored data packets.

Referring to FIGS. 2A and 2B, a first queue entry, "Qa," of an exemplary queue array Qa–Qn is shown. Each queue entry included in queue array Qa–Qn includes a three-block queue descriptor 51a–51n, and may also include additional BDAs that are linked to the same queue entry. Each queue descriptor 51a–51n includes a first block 52a–52n that contains the head BDA for the queue entry, a second block 54a–54n that contains the "tail" address for the queue entry and a third block 56a–56n that contains a "queue count" for the queue entry.

As an example of a queue entry that includes both a head BDA and a linked BDA, queue "Qa" is shown. In this example, head block 52a has the BDA that will be returned in response to a first De-queue command specifying entry Qa. Head BDA 52a links to a second BDA stored at address "a:" 57a. "Tail" block 54a contains the address "b:" of the last linked address of entry Qa. The address contained in Tail block 54a points to the storage location where another BDA may be En-Queued (and linked to) queue entry Qa. Third block 56a contains a current value of Queue Count that indicates a number of linked buffer descriptors included in the queue entry Qa. In this example, Queue Count 56a equals two, indicating a first BDA in the "head" location 52a and a second linked BDA in block 57*a*. It is noted that the BDA contained in the head block 52*a*–52*n*, of each queue descriptor 51*a*–51*n*, contains the BDA and Cell Count of the second linked BDA on the queue entry Qa, 57*a*–57*n*, unless the queue entry Qa includes only a single BDA.

Figure 3:
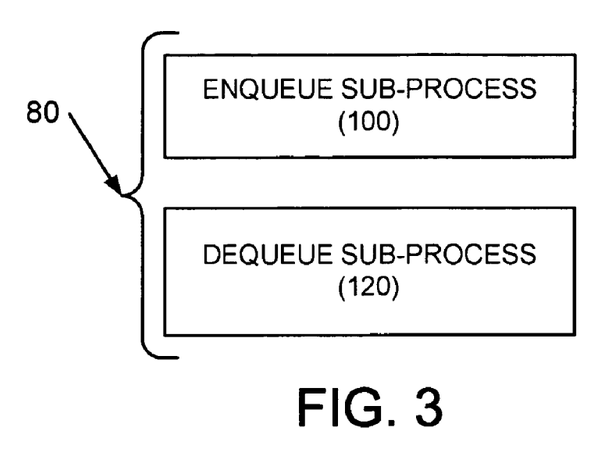
FIG. 3 is a flowchart showing a queue management process.

Referring to FIG. 3, a process 80 is shown for En-queueing BDAs and linking the BDAs to subsequent BDAs using the queue array shown in FIGS. 2A and 2B. Process 80 includes a sub-process 100 that depicts En-queueing a BDA onto a queue array structure, and a sub-process 120 that depicts De-queueing a BDA from a queue array.

Figure 3A:
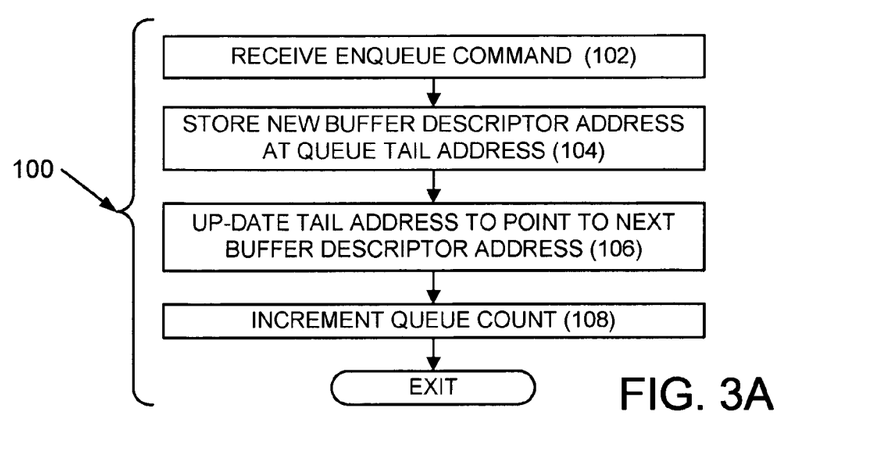
FIG. 3A is a flowchart showing an en-queuing process.

Referring to FIG. 3A, a example of the sub-process 100 receives (102) an En-queue command that specifies a Q queue entry in the queue array Qa–Qn and a BDA for a new data buffer. Sub-process 100 stores (104) the new BDA in the location indicated by the tail address, up-dates (106) the tail address to point to the new BDA and increments (108) the queue count by one (block 56*a*–56*n*). Sub-process 100 may be repeated to store and link additional data buffers onto the "tail" of a queue entry, that is, En-queueing an additional BDA onto the linked address location at the tail of a queue entry, etc.

Figure 3B:
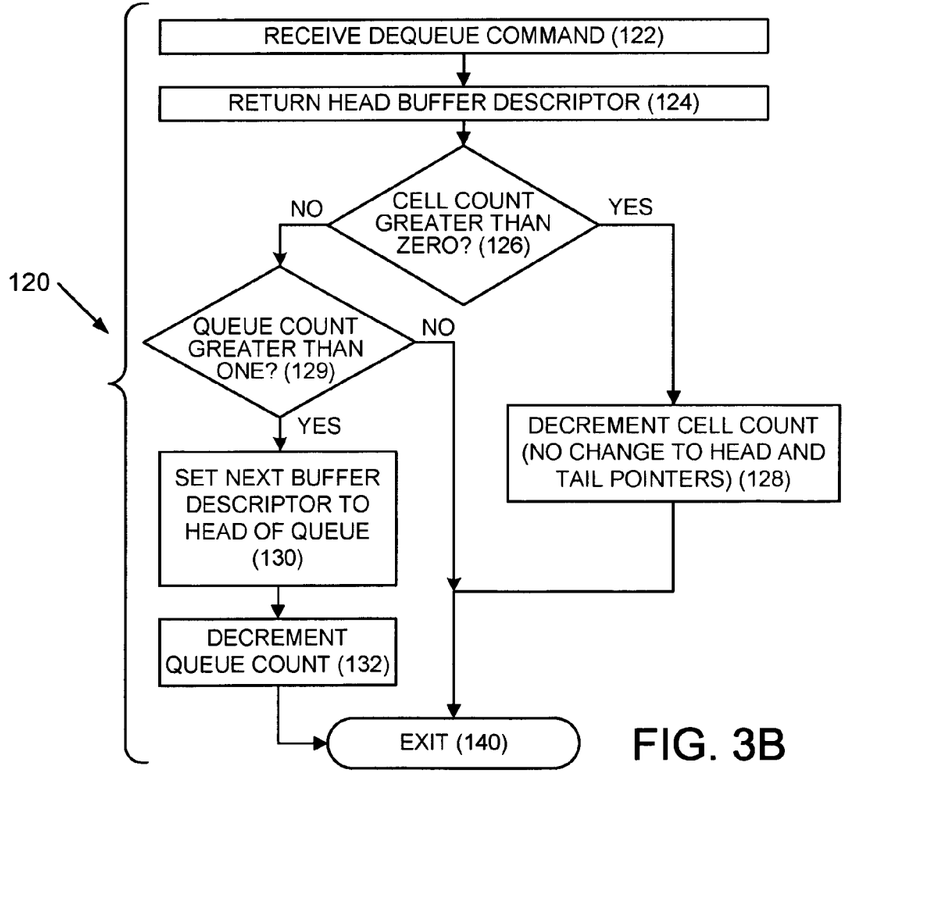
FIG. 3B is a flowchart showing a de-queuing process.

Referring to FIG. 3B, an example of sub-process 120 depicts a process of De-queueing data buffers, i.e., BDAs, from a queue entry included in queue array Qa–Qn. Sub-process 120 receives (122) a De-queue command that specifies a queue entry included in queue array Qa–Qn. Sub-process 120 returns (124) the BDA from the head of the queue descriptor for the specified queue entry to the requesting processor. Sub-Process 120 determines (126) whether the cell count from the head BDA is greater than zero. If the cell count is greater than zero, sub-process 120 decrements (128) the cell count included in the head BDA and exits (140). If the cell count is not greater than zero, process 120 determines (129) if the Queue Count is greater than or equal to one. If the Queue Count is not greater than or equal to one (indicating the queue entry is empty) sub-process 120 exits (140). If the Queue Count is determined (129) greater than or equal to one (indicating the queue entry contains another linked BDA) sub-process 120 sets (130) the next linked BDA to be the head buffer descriptor decrements (132) the queue count and exits (140). Sub-process 120 may be repeated to De-queue the head BDA and subsequent linked BDAs stored in a queue entry in queue array 24.

Performing process 80 on a system, such as system 10, enables the system to keep a multiple-cell data buffer that is being transmitted at the head of a queue entry. This is an advantage when a relatively large number of I/O buffers are being served concurrently, with one or more I/O buffers requiring cell-at-a-time data transmission.

Figure 2C:
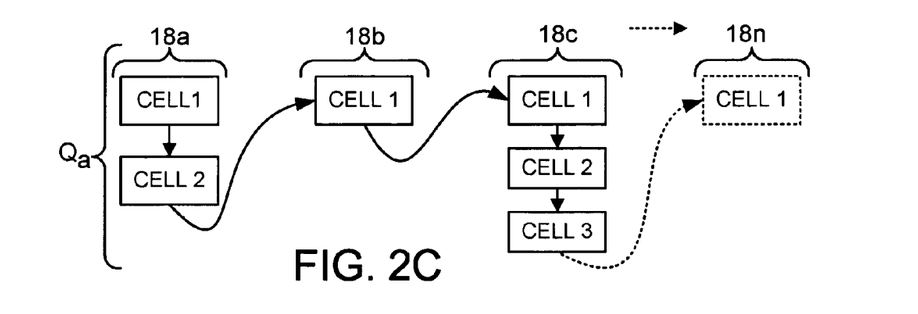
FIG. 2C is a flowchart representing the transmission of data packets.

Referring to FIG. 2C, a logical representation of the sequence of data packets that are transmitted by a system performing process 80 is shown. The data buffers; 18*a*–18*n*, and cell numbers of FIG. 2C correspond to the same numbers shown in FIGs. 1 and 2B. As shown in FIG. 2C, a system performing process 80 causes the two cells of data buffer 18*a* to be transmitted before the transmission of the first cell of data buffer 18*b* is begun. Likewise, data buffer 18*b* completes transmission before the first cell of data buffer 18*c* begins transmission, and so forth.

Process 80 is not limited to use with the hardware and software of FIG. 1. It may find applicability in any computing or processing environment. Process 80 may be implemented in hardware, software, or a combination of the two. Process 80 may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform process 80 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium/article (e.g., CD-ROM, hard disk, or magnetic diskette) that is readable by a general or special purpose programmable computer for configuring and operating the computer when the storage medium or device is read by the computer to perform process 80. Process 80 may also be implemented as a machine-readable storage medium, configured with a computer program, where, upon execution, instructions in the computer program cause a machine to operate in accordance with process 80.

The invention is not limited to the specific embodiments described above. For example, a single memory may be used to store both data packets and buffer descriptors. Also, the buffer descriptors and BDAs may be stored substantially simultaneously in second memory 20 and queue array 24 (see FIG. 1).

Other embodiments not described herein are also within the scope of the following claims.

The invention claimed is:

1. A method of managing queues, comprising:
storing addresses corresponding to a plurality of data buffers having a corresponding number of cells in a queue configured as a linked list comprising a plurality of Buffer Descriptor Address (BDA) entries, wherein a first BDA entry points to a subsequent BDA entry and to a final BDA entry, each of the plurality of BDA entries of the linked list includes one of the data buffer addresses and an associated a cell count that indicates the corresponding number of cells contained in the corresponding data buffer;
retrieving a first address from the queue; and
modifying the linked list of addresses of the queue based on the cell count of the first address retrieved, including decrementing the cell count of the first address each time the first address is retrieved.

2. The method of claim 1, further comprising:
determining the cell count is zero.

3. The method of claim 2, wherein storing addresses further comprises:
setting the first address as the head address of the queue; and
linking a second address to the first address of the queue.

4. The method of claim 3, wherein linking the second address to the first address further comprises:
setting the second address as a tail address of the queue.

5. The method of claim 4, further comprising:
linking a third address to the queue by storing the third address in the location indicated by the tail address.

6. The method of claim 4, further comprising:
incrementing a queue count indicating the number of BDA entries included in the queue each time an address is linked to the queue.

7. The method of claim 3, wherein the queue is stored as part of a queue array having a plurality of linked queues.

8. An article comprising a machine-readable medium that stores machine-executable instructions for managing a queue array, the instructions causing a machine to:

store addresses corresponding to a plurality of data buffers having a corresponding number of cells in a queue configured as a linked list comprising a plurality of Buffer Descriptor Address (BDA) entries, wherein a first BDA entry points to a subsequent BDA entry and to a final BDA entry, each of the plurality of BDA entries of the linked list includes one of the data buffer addresses and an associated cell count that indicates the corresponding number of cells contained in the corresponding data buffer;

retrieve a first address from the queue; and modify the linked list of addresses of the queue based on the cell count of the first address retrieved, including decrementing the cell count of the first address each time the first address is retrieved.

9. The article of claim 8, further comprising instructions causing a machine to:

determine the cell count is zero.

10. The article of claim 9, wherein storing further comprises instructions causing a machine to:

set the first address as the head address of the queue; and link a second address to the first address of the queue.

11. The article of claim 10, wherein linking comprises setting the second address as a tail address of the queue.

12. The article of claim 11, further comprising instructions causing a machine to:

link a third address to the queue by storing the third address in the location indicated by the tail address.

13. The article of claim 11, further comprising instructions causing a machine to:

increment a queue count indicating the number of BDA entries included in the queue each time an address is linked to the queue.

14. The article of claim 10, wherein the queue is stored as part of a queue array having a plurality of linked queues.

15. An apparatus, comprising:

a first storage device for holding queues;

a second storage device for holding data packets;

a memory that stores executable instructions; and a processor that executes the instructions to:

store addresses corresponding to a plurality of data buffers having a corresponding number of cells in a queue configured as a linked list comprising a plurality of Buffer Descriptor Address (BDA) entries, wherein a first BDA entry points to a subsequent BDA entry and to a final BDA entry, each of the plurality of BDA entries of the linked list includes one of the data buffer addresses and an associated cell count that indicates the corresponding number of cells contained in the corresponding data buffer;

retrieve a first address from the queue, and modify the linked list of addresses of the queue based on the cell count of the first address retrieved, including decrementing the cell count of the first address each time the first address is retrieved.

16. The apparatus of claim 15, wherein instructions to modify comprise instructions to:

determine the cell count is zero.

17. The apparatus of claim 16, wherein instructions to store addresses comprises instructions to:

set the first address as the head address of the queue; and link a second address to the first address of the queue.

18. The apparatus of claim 17, wherein instructions to link comprises instructions to:

set the second address as a tail address of the queue.

19. The apparatus of claim 18, further comprising instructions to:

link a third address to the queue by storing the third address in the location indicated by the tail address.

20. The apparatus of claim 18, further comprising instructions to:

increment a queue count indicating the number of BDA entries included in the queue each time an address is linked to the queue.

21. The apparatus of claim 17, further comprising:

a storage medium, the queue being stored on the storage medium as part of a queue array having a plurality of linked queues.

22. A processing system for managing queues comprising:

a processor;

a memory to store queues; and a storage-medium accessible by the processor to store executable instructions, which when accessed by the processor cause the processor to:

store addresses corresponding to a plurality of data buffers having a corresponding number of cells in a queue configured as a linked list comprising a plurality of Buffer Descriptor Address (BDA) entries, wherein a first BDA entry points to a subsequent BDA entry and to a final BDA entry, each of the plurality of BDA entries of the linked list includes one of the data buffer addresses and an associated cell count that indicates the corresponding number of cells contained in the corresponding data buffer;

retrieve a first address from the queue; and modify the linked list of addresses of the queue based on the cell count of the first address retrieved, including decrementing the cell count of the first address each time the first address is retrieved.

23. The system of claim 22, further comprising instructions, which when accessed by the processor causes the processor to:

determine the cell count is zero.

24. The system of claim 23, wherein storing addresses further comprises:

setting the first address as the head address of the queue; and linking a second address to the first address of the queue.

25. The system of claim 24, wherein linking the second address to the first address further comprises instructions, which when accessed by the processor causes the processor to:

setting the second address as a tail address of the queue.

26. The system of claim 25, further comprises instructions, which when accessed by the processor causes the processor to:

link a third address to the queue by storing the third address in the location indicated by the tail address.

27. The system of claim 25, further comprises instructions, which when accessed by the processor causes the processor to:

increment a queue count indicating the number of BDA entries in the queue each time an address is linked to the queue.

28. The method of claim 1, further comprising:

receiving network packets; and storing the packets in one or more of the plurality of data buffers.

29. The article of claim 8 further comprising instructions that cause the machine to:
- receive network packets; and
- store the packets in one or more of the plurality of data buffers.

30. The apparatus of claim 15, wherein the processor executes further instructions to:
- receive network packets; and
- store the packets in one or more of the plurality of data buffers.

31. The processing system of claim 22, wherein the storage medium further includes instructions that when accessed by the processor cause the processor to:
- receive network packets; and
- store the packets in one or more of the plurality of data buffers.

* * * * *